United States Patent [19]

Watson et al.

[11] Patent Number: 5,016,486
[45] Date of Patent: May 21, 1991

[54] REVERSING DRIVE MECHANISM

[75] Inventors: William L. Watson, Mitchell; Kenneth E. Watson, Morrill, both of Nebr.

[73] Assignee: Watson Welding & Mfg. Inc., Morrill, Nebr.

[21] Appl. No.: 514,176

[22] Filed: Apr. 25, 1990

[51] Int. Cl.$^5$ .............................................. F16H 15/00
[52] U.S. Cl. ........................................................ 74/205
[58] Field of Search .................................. 74/205, 202

[56] References Cited

U.S. PATENT DOCUMENTS

| | | |
|---|---|---|
| 797,402 | 8/1905 | Case, Jr. et al. ...................... 74/205 |
| 901,172 | 10/1908 | Holgan et al. .......................... 74/205 |
| 2,911,839 | 11/1959 | Peace ...................................... 74/205 |
| 3,350,731 | 11/1967 | Benjamin .......................... 74/205 X |

Primary Examiner—Philip C. Kannan
Attorney, Agent, or Firm—Dean P. Edmundson

[57] ABSTRACT

A reversing drive mechanism is described for use in a mechanical drive system. The drive mechanism includes a drive bearing which is movable between two positions. In one position the bearing is able to transmit the rotational motion of the input shaft directly to an output shaft. In another position the bearing is able to reverse the rotational motion of the input shaft and transmit it to the output shaft to drive it in a direction opposite to the input shaft. The reversing drive mechanism has utility in a variety of applications.

12 Claims, 8 Drawing Sheets

FIG. 7
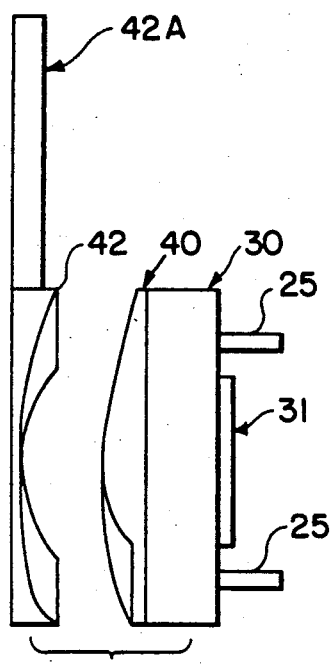
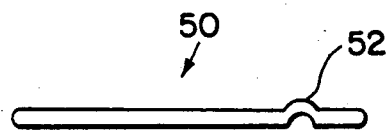
FIG. 8A
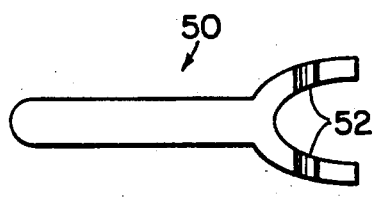
FIG. 8B
FIG. 9
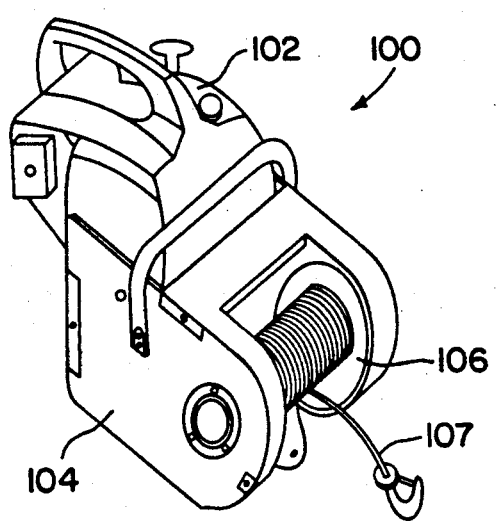
FIG. 10
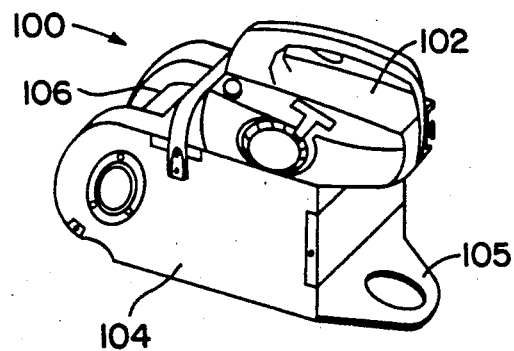

REVERSING DRIVE MECHANISM

FIELD OF THE INVENTION

This invention relates to drive mechanisms. More particularly, this invention relates to reversing drive mechanisms. In another aspect, this invention relates to a reversing drive mechanism for use in connection between a drive shaft and a driven shaft.

BACKGROUND OF THE INVENTION

There are numerous mechanical systems or applications in which a drive shaft transmits rotational energy to another component (e.g., to a pulley, gear, drum, etc.). Oftentimes it is necessary or desirable for a drive shaft to be able to be reversed in its direction of rotation for one purpose or another.

Although it is possible, and quite conventional, to provide for reverse rotation of a drive shaft through the use of a reverse gear in a transmission, in some mechanical systems there is no transmission used. Rather, there is a direct connection between the drive shaft and the component being driven. Also, transmission systems which include a reverse gear can be quite expensive and are naturally more complex in design and construction than transmissions which do not include a reverse gear.

There has not heretofore been provided a simple and effective reversing drive mechanism which can be used between a drive shaft and a driven shaft.

SUMMARY OF THE PRESENT INVENTION

In accordance with the present invention there is provided a reversing drive mechanism comprising:

(a) a housing;
(b) an input shaft having first and second ends; said first end extending into and being rotatably supported in said housing;
(c) an output shaft having first and second ends; said first end extending into and being rotatably supported in said housing;
(d) disk means secured to said input shaft adjacent said first end;
(e) a bearing carried by said first end of said output shaft; said bearing including an inner race member and an outer race member; wherein said inner race member is rotationally fixed to said output shaft; wherein said bearing is axially movable on said output shaft between first and second positions;
(f) thrust means for moving said bearing axially on said output shaft between said first and second positions.

When the bearing is in the first position, the input shaft is adapted to drive the output shaft rotationally in the same direction as the input shaft. When the bearing is in the second position, the disk means is adapted to drive the outer race member rotationally in a manner such that the inner race member and the output shaft are driven rotationally in a direction opposite to the input shaft.

The reversing drive mechanism can be used in a variety of applications. For example, it can be used in power winches, outboard motor power systems; drill systems; tap drivers; and any other system where there is a power input shaft and an output shaft (e.g., screw or nut driving systems). The mechanism of this invention enables the output shaft to be rotated in a direction opposite to that of the input shaft.

Other advantages of the reversing drive mechanism of the invention will become apparent from the following detailed description.

BRIEF DESCRIPTION OF THE DRAWINGS

The invention is described in more detail hereinafter with reference to the accompanying drawings, wherein like reference characters refer to the same parts throughout the several views and in which:

FIG. 7 illustrates another means for controlling movement of the drive bearing between forward and reverse positions;

FIGS. 8A and 8B illustrate yet another means for controlling movement of the drive bearing between forward and reverse positions;

FIGS. 9 and 10 illustrate a winch system which includes a reversing drive mechanism of the invention;

DETAILED DESCRIPTION OF THE INVENTION

Figure 1:
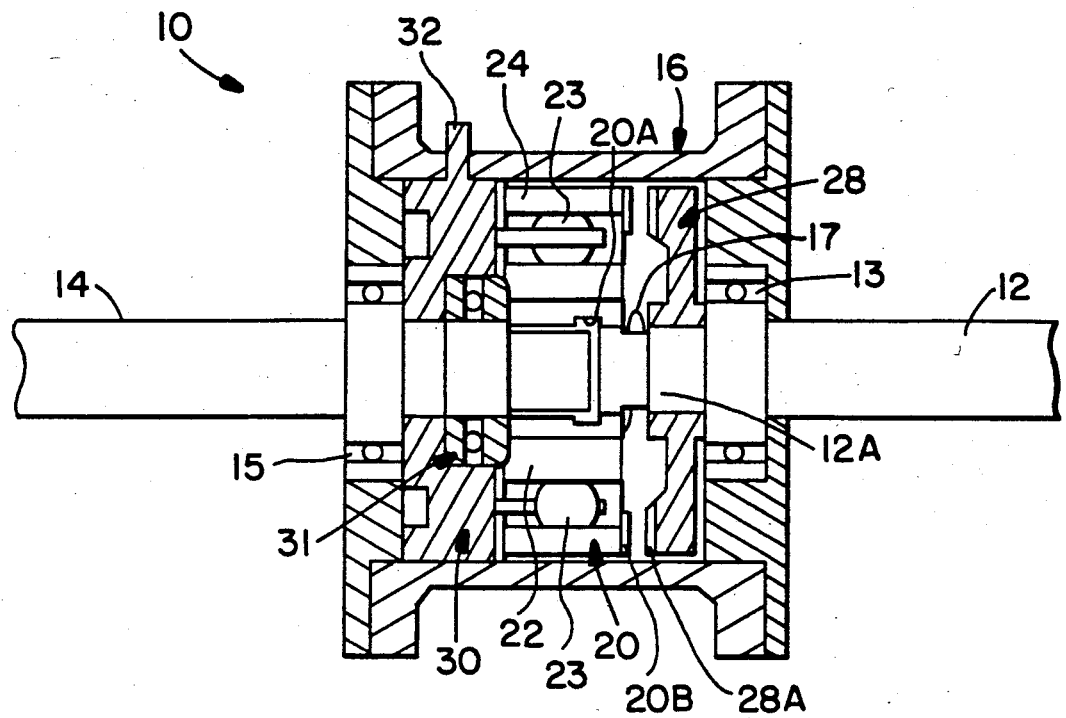
FIG. 1 is a cross-sectional view of a preferred embodiment of reversing drive mechanism of the invention adapted for forward driving of an output shaft.
Figure 2:
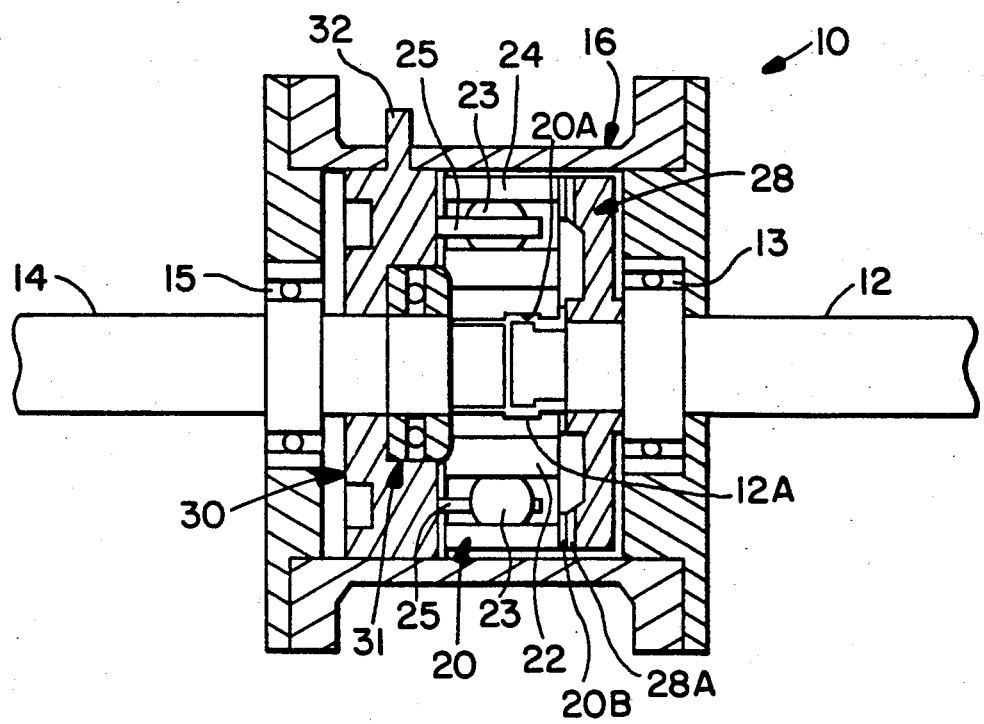
FIG. 2 is a cross-sectional view of the reversing drive mechanism of FIG. 1 adapted for reverse driving of an output shaft.

One embodiment of reverse drive mechanism 10 is illustrated in FIGS. 1 and 2. In FIG. 1 the apparatus is in a position such that the input shaft 12 is adapted to rotatably drive output shaft 14 in the same direction as shaft 12. In FIG. 2 the input shaft is adapted to rotatably drive the output shaft in the opposite direction as shaft 12. Thus, the apparatus can be readily shifted between two positions (one for forward drive and one for reverse drive).

The mechanism 10 comprises a housing 16, an input shaft 12 having first and second ends, as shown, and an output shaft 14 having first and second ends. The first end of input shaft 12 extends into the housing and is supported by bearing 13. The first end of the output shaft also extends into the housing and is supported by bearing 15, as shown.

A drive bearing 20 carried by the first end of the output shaft includes an inner race member 22 and an outer race member 24. The inner race member is rotationally fixed to the output shaft. The drive bearing 20 is axially movable on the output shaft between first and second positions.

When the bearing 20 is in its first position (shown in FIG. 1), the bearing engages the first end of input shaft 12. Bearing 20 includes a longitudinal bore through its center. The bore is non-circular and is adapted to slidably receive the ends of the input shaft and the output shaft. The bore also includes an annular groove or channel 20A which enables the end 12A of input shaft 12 to rotate freely within the groove when the bearing is in the position shown in FIG. 2.

The first end of the input shaft 12 also includes a disk 28 secured thereto. The disk includes a face 28A which is adapted to engage face 20B on the outer edge of bearing 20, as illustrated. Thus, when bearing 20 is in its second position, face 28A frictionally engages the edge 20B of outer race member 24, as shown in FIG. 2. Face 28A may comprise a conventional clutch pad material, for example.

Then rotation of input shaft 12 and disk 28 engages surface 20B of outer race member 24 and causes race member 24 to rotate in the same direction as the input shaft. Ball bearings 23 are thereby caused to rotate and thereby cause inner race member 22 to rotate in the opposite direction. Pin members 25 prevent the ball bearings 23 from moving freely around the inner race 22. Thus, rotation of the ball bearings 23 instead causes the inner race member to rotate in a direction opposite to the direction of rotation of the input shaft.

Thrust means 30 comprises a pressure plate with a bearing 31 which is axially movable on shaft 14. A lever 32 secured to the plate is used for moving the plate between first and second positions. In the first position (shown in FIG. 1) the thrust means is in the far left position so that bearing 20 engages the end 12A of input shaft 12. A return spring 17 between bearing 20 and disk 28 urges bearing 20 toward its first position. In the second position (FIG. 2) the thrust means has been moved to the right so that bearing 20 has been disengaged from the end 12A of shaft 12.

Figure 3A:
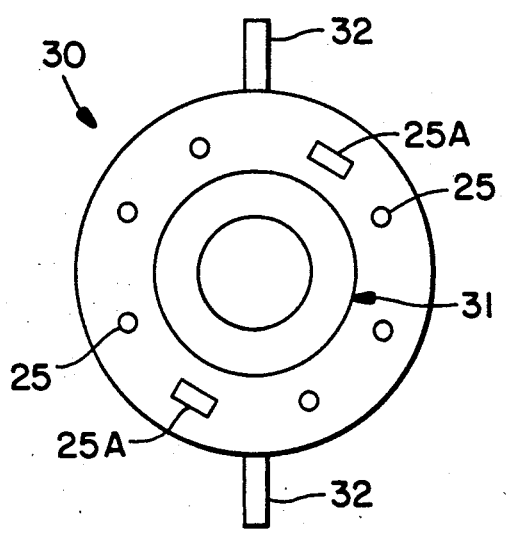
FIG. 3A is a front elevational view of the pressure plate and thrust bearing.
Figure 4A:
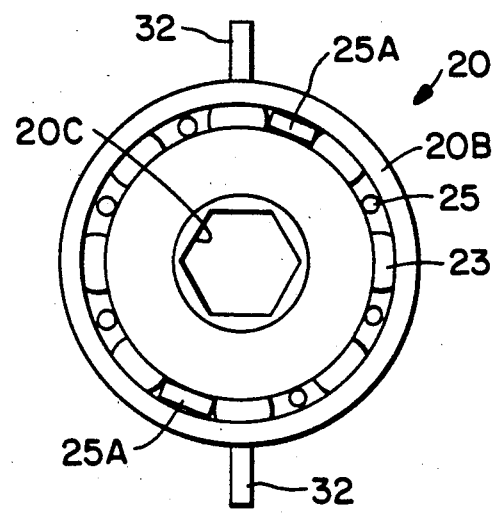
FIG. 4A is a front elevational view illustrating the drive bearing of the reversing drive mechanism secured to the pressure plate.
Figure 3:
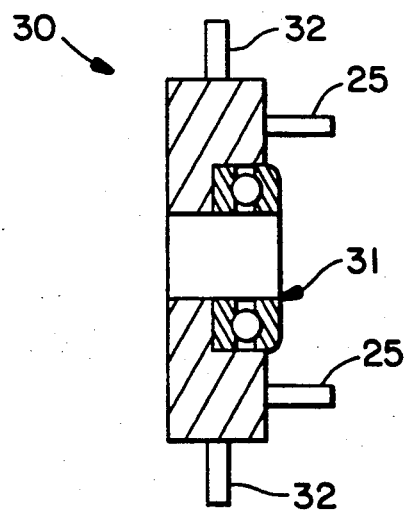
FIG. 3 is a cross-sectional view of a pressure plate and thrust bearing which may be used in the present invention.

FIG. 3 is a cross-sectional view of the thrust means 30, including bearing 31. FIG. 3A is a front elevational view of the thrust means. The pins 25 are equidistantly spaced around the pressure plate, as shown. Two pins 25A have a larger head, as shown, so as to retain bearing 20 on the thrust means 32 (as shown in FIG. 4A).

Figure 4:
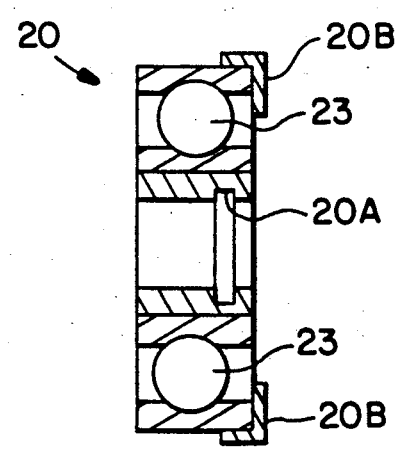
FIG. 4 is a cross-sectional view of the drive bearing of the reversing drive mechanism.

FIG. 4 is a cross-sectional view of the drive bearing 20. FIG. 4A is a front elevational view of the thrust means and the drive bearing when assembled. The drive bearing is fastened or attached to the face of the thrust means by pins 25A. Each ball bearing 23 is separated from an adjacent ball bearing by a pin member 25, as illustrated.

The center bore 20C of the bearing 20 is non-circular. Preferably it is a hexagonal cross-section, although it could instead be splined or other multi-sided configuration, or it may even be keyed.

Figure 5A:
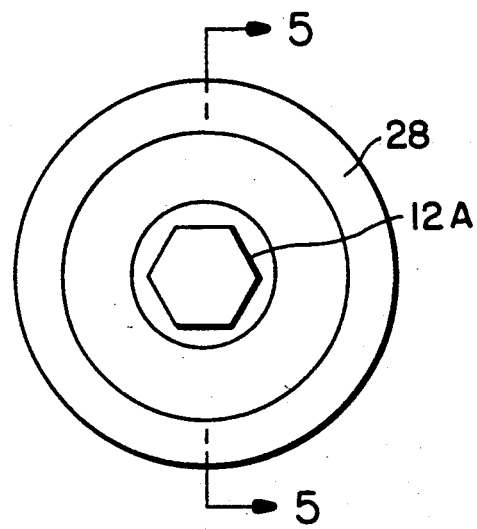
FIG. 5A is a front elevational view of the input shaft and attached disk member.
Figure 5:
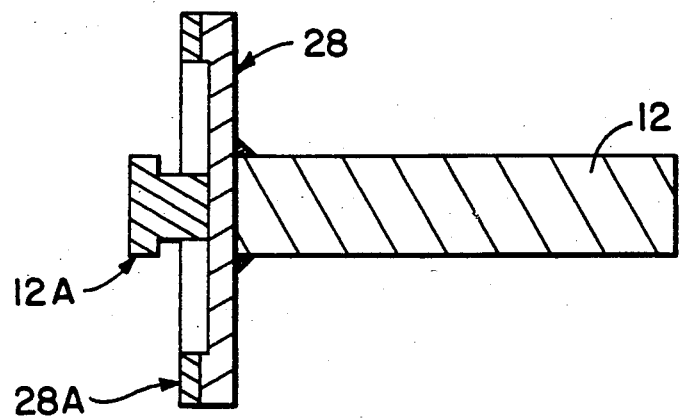
FIG. 5 is a cross-sectional view of the input shaft with attached disk member.

FIG. 5 is a cross-sectional view of the input shaft 12 and disk means 28. FIG. 5A is a front elevational view of the input shaft and disk means. The disk 28 is welded, keyed, or otherwise secured to the input shaft so that it will rotate in unison with shaft 12.

Figure 6:
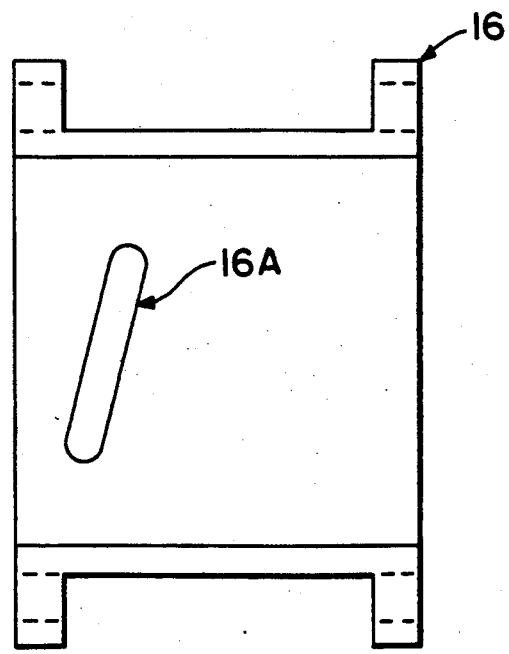
FIG. 6 is a top view illustrating one means for controlling movement of the drive bearing between forward and reverse positions.

FIG. 6 is a top view of the housing 16 which is shown in FIGS. 1 and 2. The housing includes an elongated slot 16A through which lever 32 projects. Movement of the lever in the slot causes the thrust means to be moved between the two positions shown in FIGS. 1 and 2. Preferably there are two such levers 32. One projects a slot in the upper side of the housing and the projects through a slot in the lower side of the housing. The use of two such levers 32 on opposite sides of the avoids binding of the pressure plate or thrust means it is moved between its first and second positions.

FIG. 7 is a side elevational view illustrating another type of thrust means which can be used in the present invention. In this embodiment there is a cam member 40 which is intended to be axially movable with respect to the output shaft of the drive mechanism but is rotationally fixed or stationary. For example, cam 40 may be keyed to the housing to prevent rotation. Cam member 42 is adapted to be rotated between first and second positions by means of lever 42A so as to cause cam member 40 to move axially with respect to the output shaft. Thrust means or pressure plate 30 is positioned on cam 40, with the pin members 25 extending between adjacent ball bearings of the drive bearing in the manner shown above.

FIGS. 8A and B illustrate a side view and front view, respectively, of another type of thrust means which may be used in the drive mechanism of this invention. This embodiment comprises a forked lever 50. Raised portions 52 on the forked end serve as pressure points for moving a pressure plate and the bearing 20 axially with respect to the output shaft. Spring clips may be used to hold the pressure plate to the forked lever. The lever may be used to pry against a slot cut in the housing 16. The pressure plate may be keyed to the housing to prevent rotation.

Figure 11:
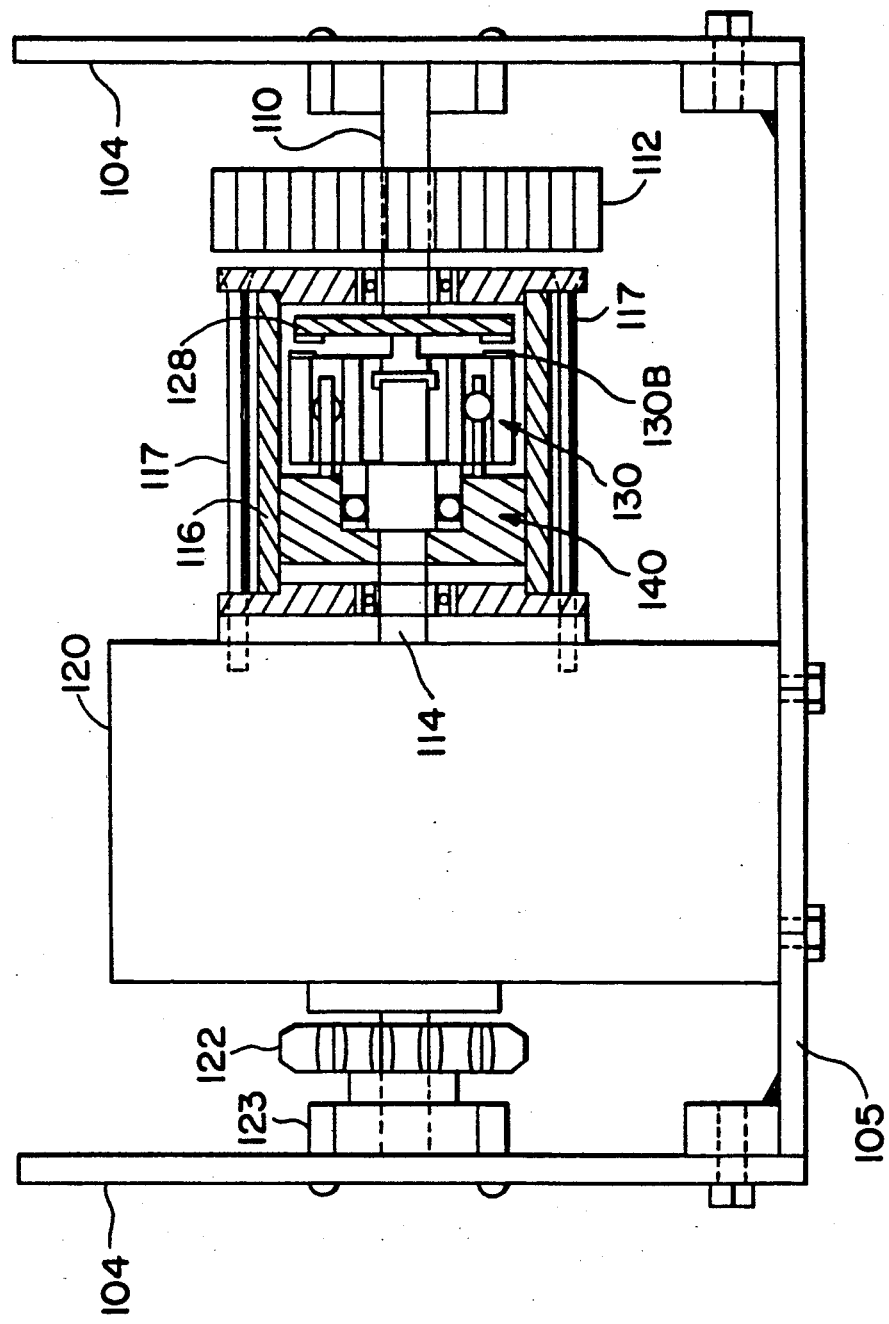
FIG. 11 is a rear elevational, partially cut-away view of the winch system.

The reverse drive mechanism of the invention has utility in a variety of applications. For example, it may be used in a power winch, as shown in FIGS. 9-11 and as described in more detail in copending application Ser. No. 514,091 filed of even date, incorporated herein by reference.

A portable power winch 100 is shown in perspective in FIGS. 9 and 10. The winch includes gasoline engine 102, side plates 104, bottom plate 105, rotatable drum 106, and a length of cable 107 secured to the drum.

FIG. 11 is a rear elevational partially cut-away view of the winch 100. Shaft 110 is powered by the engine via a drive pulley 112 and a belt or chain (not shown). Output shaft 114 extends into gearbox 120. Chain sprocket 122 is powered by the output shaft of the gearbox. Bearing 123 supports the outer end of the output shaft of the gearbox.

A reversing drive system of the invention is operatively connected between the input shaft 110 and the output shaft 114. Housing 116 is secured to gearbox 120 by means of bolts 117. Drive bearing 130 within the housing is adapted to engage one end of the input shaft and one end of the output shaft. In this manner the rotation of the input shaft 110 causes the output shaft 114 to rotate in the same direction. When thrust means or pressure plate 140 is urged to the right, drive bearing 130 is disengaged from the end of the input shaft 110. Face 130B of bearing 130 then frictionally engages the opposing face of disk means 128 carried by input shaft 110. This causes the outer race member of drive bearing 130 rotate in the same direction as input shaft 110. The output shaft 114, however, is driven in the opposite direction in the manner described above in detail in connection with FIGS. 1 and 2.

Also included in the reversing drive mechanism used in the winch shown in FIG. 11 is means for moving the pressure plate 140 between its two positions. This may be any of the means described above in connection with FIGS. 1, 2, 3, 6, 7 and 8, for example.

It is also possible to include in the winch a conventional bidirectional clutch or brake (e.g., a bidirectional spring-wrapped clutch) on the input side of the gearbox. This allows the input shaft to the gearbox to be rotated in either direction from one end only. These types of clutches are conventional and well known. They are also commercially available.

Use of the reversing drive mechanism in a power winch enables the drum to be driven in either direction, as desired. Thus, the drum can be driven in reverse to uncoil cable from the drum. This may be easier and smoother than taking cable off the drum in a free rotation state. There may also be situations where it is desirable to lower a load by driving the drum in reverse.

Figure 12:
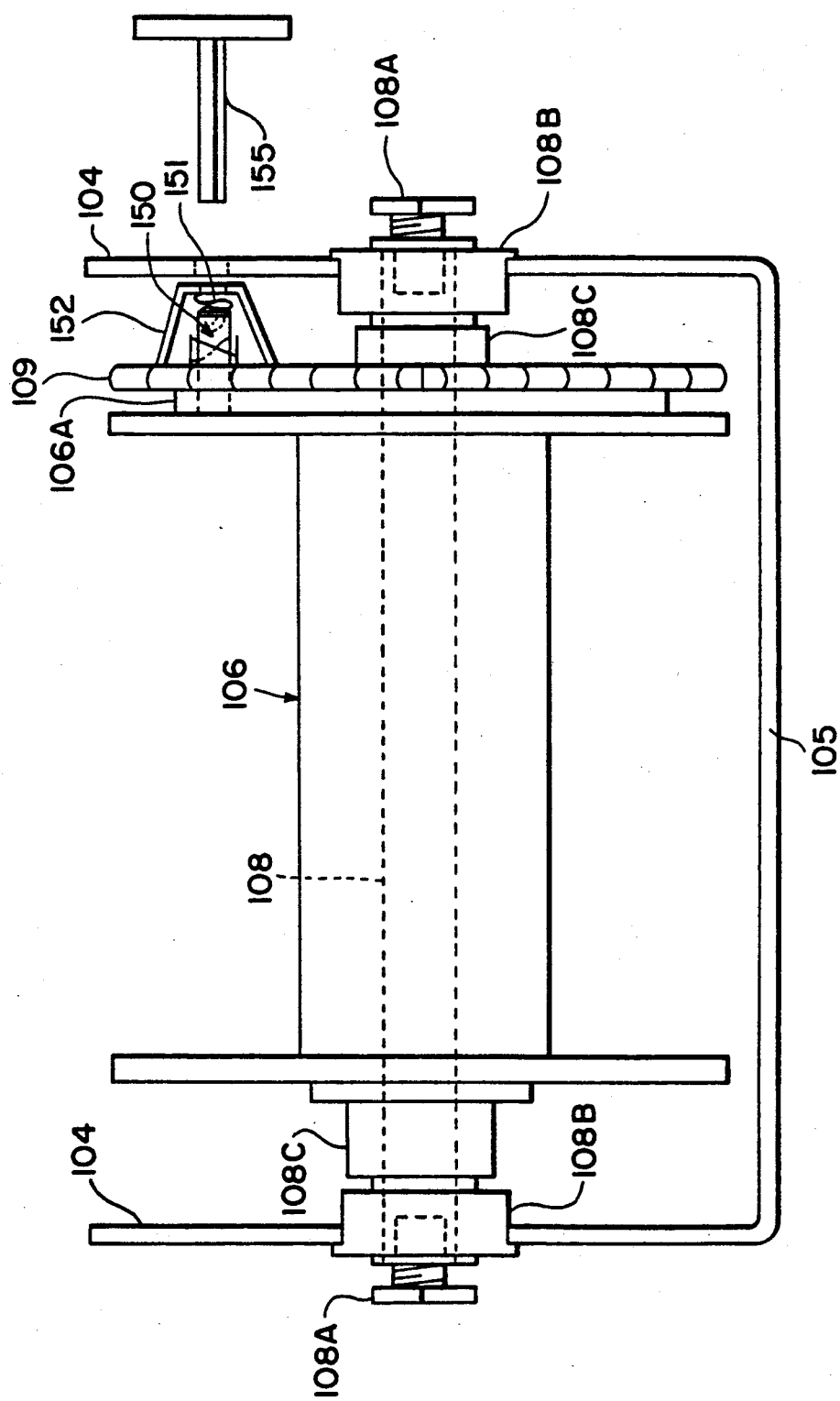
FIG. 12 is a front elevational view of the winch system.
Figure 13:
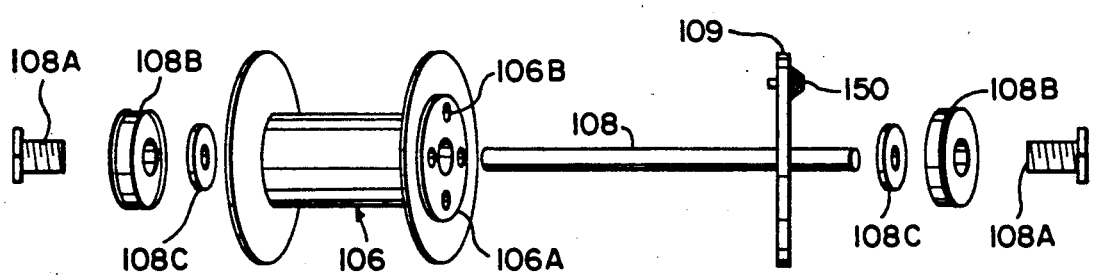
FIG. 13 is an exploded view of a drum assembly used in the winch system.

FIG. 12 is a front elevational view of the power winch. FIG. 13 is an exploded view of the drum assembly. This shows the manner in which the drum 106 is supported and driven in the winch system between upright wall sections 104 and above floor plate 105. Axle or shaft 108 extends through the drum and each side plate. The ends of shaft 108 are secured by means of axle tie bolts 108A and flange bearings 108B. Spacers 108C are carried by the axle or shaft on opposite ends of the drum, as illustrated.

Drive sprocket 109 is welded or otherwise secured to axle or shaft 108 and it is powered or driven by a chain (or belt) from gear 122 at the gearbox 120. Drive plate 106A is secured to one end of drum 106. A spring-loaded pin 150 carried on sprocket 109 is movable between two positions. When the pin is moved to the left it can slidingly engage an opening 106B in plate 106A and thereby lock sprocket 109 to plate 106A and drum 106. When the pin 150 is moved to the right it becomes disengaged from plate 106A. This then enables drum 106 to rotate freely relative to axle 108 and sprocket 109.

Figure 14A:
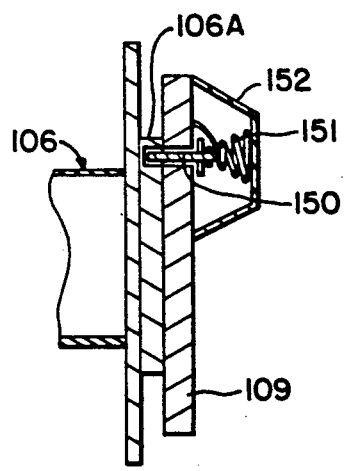
FIG. 14A and 14B are cross-sectional views illustrating two positions of a pin system used to secure the drum of the winch against free rotation.
Figure 14B:
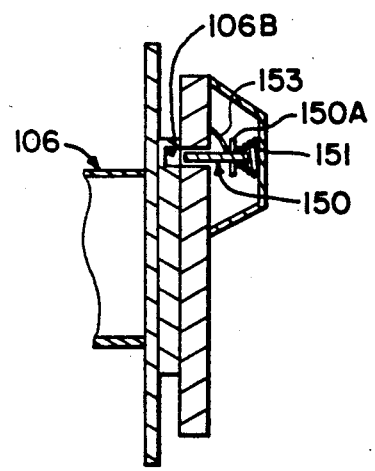

Pin 150 is urged to its normal engaged position by means of spring 151 between bracket 152 and the outer end of pin 150. This is shown more clearly in FIG. 14A and B. A cross-pin 150A extends through pin 150 and enables pin 150 to be rotated (e.g., with a hex key 155) so as to climb ramp or cam member 153 adjacent the pin 150. In this manner the pin 150 is held out of engagement with plate 106A on drum 106. Rotating the pin 150 again enables the pin to be urged to the left by spring 151 to thereby engage plate 106A as shown in FIG. 14A.

Figure 15:
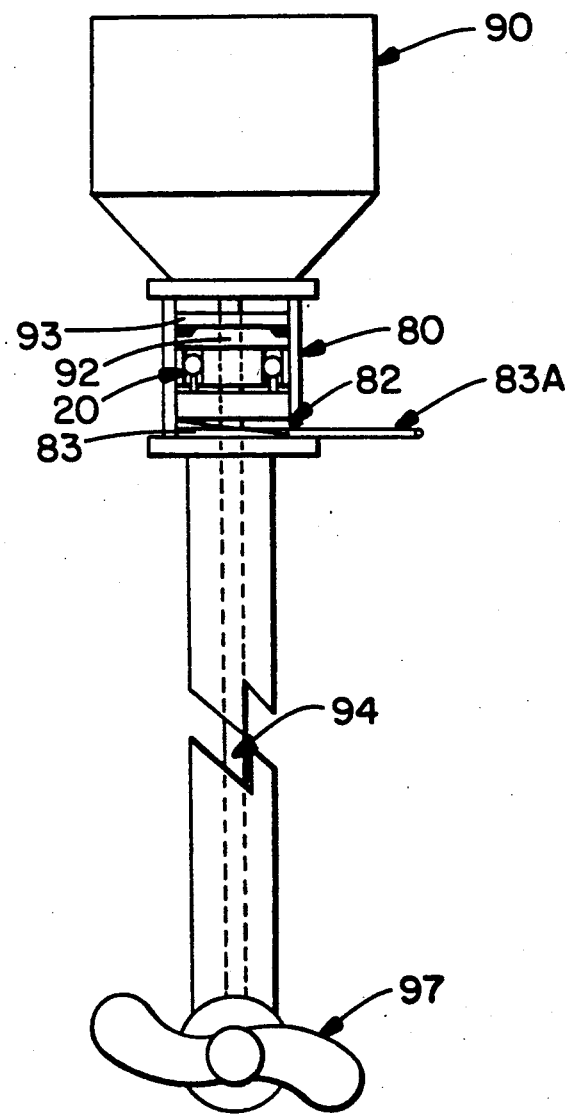
FIG. 15 illustrates the reverse drive mechanism of the invention in an outboard motor.

Another example of utility for the reverse drive mechanism is illustrated in FIG. 15. In this example the reverse drive mechanism 80 is installed in an outboard motor 90 drive system. Cam member 82 and cam member 83 operate to cause the pressure plate and drive bearing to move between first and second positions. Lever 83A attached to cam member 83 is adapted to rotate cam member 83. Cam member 82 is rotationally fixed but is axially movable.

When the cam member 82 is urged upwardly, it urges bearing 20 upwardly until it becomes disengaged from the end of shaft 92. Then disk 93 on shaft 92 engages the outer race member of bearing 20. As a result, the output shaft 94 is caused to rotate in the opposite direction from that of the input shaft to thereby drive propeller 97 in reverse.

The reversing drive system of this invention can be used in various other drive systems also. For example, it may be used in a drill system, or a tap driver system, or a screw or nut driver system. In other words, the reversing drive system of this invention can be used in any power system where it is desired to have the ability to reverse the direction of rotation of an output shaft.

Other variants are also possible without departing from the scope of this invention.

What is claimed is:

1. Reversing drive mechanism comprising:
   (a) a housing;
   (b) an input shaft having first and second ends; said first end extending into and being rotatably supported in said housing; wherein said input shaft is axially fixed relative to said housing;
   (c) an output shaft having first and second ends; said first end extending into and being rotatably supported in said housing; wherein said output shaft is axially fixed relative to said housing;
   (d) disk means secured to said input shaft adjacent said first end;
   (e) a bearing carried by said first end of said output shaft; said bearing including an inner race member is an outer race member; wherein said inner race member is rotationally fixed to said output shaft; wherein said bearing is axially movable thereon between first and second positions;
   (f) thrust means for moving said bearing axially on said output shaft between said first and second positions;

wherein when said bearing is in said first position, said input shaft is adapted to drive said output shaft rotationally in the same direction as said input shaft; and wherein when said bearing is in said second position, said disk means is adapted to drive said outer race member rotationally in a manner such that said inner race member and said output shaft are driven rotationally in a direction opposite to said input shaft.

2. Reversing drive mechanism in accordance with claim 1, wherein said thrust means further comprises control means for selectively moving said bearing between said first and second positions on said output shaft.

3. Reversing drive mechanism in accordance with claim 2, wherein said bearing includes a plurality of spherical ball members disposed between said inner and outer race members; wherein said thrust means includes a pressure plate and a plurality of pin members extending axially away from said plate and into said bearing in a manner such that each said pin member separates adjacent ball members; and wherein said pressure plate is attached to said bearing.

4. Reversing drive mechanism in accordance with claim 3, wherein said thrust means further comprises lever means for moving said bearing between said first and second positions.

5. Reversing drive mechanism in accordance with claim 2, wherein said output shaft and said input shaft are axially aligned.

6. Reversing drive mechanism in accordance with claim 5, wherein said first end of each of said input and output shafts is non-circular in cross-section; and wherein said inner race member is adapted to slidingly engage said first end of each of said input and output shafts when said bearing is in said first position.

7. Reversing drive mechanism in accordance with claim 6, wherein said inner race member includes an annular channel therein in a plane perpendicular to the axis of said input shaft; wherein said first end of said input shaft includes a head member having a non-circular cross-section; wherein when said bearing is in said first position said head member rotationally engages said inner race member; and when said bearing is in said second position said head member is disposed in said annular channel and is disengaged from said inner race member.

8. Reversing drive mechanism comprising:
   (a) a housing;
   (b) an input shaft having first and second ends; said first end extending into and being rotatably supported in said housing; wherein said input shaft is axially fixed relative to said housing;
   (c) an output shaft having first and second ends; said first end extending into and being rotatably supported in said housing; wherein said output shaft is axially fixed relative to said housing;
   (d) clutch means secured to said input shaft adjacent said first end;
   (e) a bearing carried by said first end of said output shaft; said bearing including an inner race member and an outer race member; wherein said inner race member is rotationally fixed to said output shaft; wherein said bearing is axially movable thereon between first and second positions;
   (f) thrust means for moving said bearing axially on said output shaft between said first and second positions;
   wherein when said bearing is in said first position, said input shaft is adapted to drive said output shaft rotationally in the same direction as said input shaft; and wherein when said bearing is in said second position, said clutch means is adapted to drive said outer race member rotationally in a manner such that said inner race member and said output shaft are driven rotationally in a direction opposite to said input shaft.

9. Reversing drive mechanism in accordance with claim 8, wherein said thrust means further comprises control means for selectively moving said bearing between said first and second positions on said output shaft.

10. Reversing drive mechanism in accordance with claim 9, wherein said bearing includes a plurality of spherical ball members disposed between said inner and outer race members; wherein said thrust means includes a pressure plate and a plurality of pin members extending axially away from said plate and into said bearing in a manner such that each said pin member separates adjacent ball members; and wherein said pressure plate is attached to said bearing.

11. Reversing drive mechanism in accordance with claim 10, wherein said thrust means further comprises lever means for moving said bearing between said first and second positions; and wherein said output shaft and said input shaft are axially aligned.

12. Reversing drive mechanism in accordance with claim 11, wherein said first end of each of said input and output shafts is non-circular in cross-section; and wherein said inner race member is adapted to slidingly engage said first end of each of said input and output shafts when said bearing is in said first position; and wherein said inner race member includes an annular channel therein in a plane perpendicular to the axis of said input shaft; wherein said first end of said input shaft includes a head member having a non-circular cross-section; wherein when said bearing is in said first position said head member rotationally engages said inner race member; and when said bearing is in said second position said head member is disposed in said annular channel and is disengaged from said inner race member.

* * * * *